Patented Feb. 18, 1941

2,231,902

UNITED STATES PATENT OFFICE 2,231,902

PAPER COATING MATERIAL AND THE PAPER COATED THEREWITH

James S. Offutt, Evanston, and Joseph W. Gill, Elmhurst, Ill., assignors to United States Gypsum Company, Chicago, Ill., a corporation of Illinois No Drawing. Application March 2, 1939,
Serial No. 259,386

10 Claims. (Cl. 134—20)

This invention relates to paper coating material and the paper coated therewith.

This application is a continuation in part of co-pending application Serial No. 666,352, filed April 15, 1933.

In the coating of paper, it has been the practice to use satin white as the pigment base of the coating material. Satin white is made by treating an alum solution with lime so that the resulting product contains a substantial proportion of aluminous gel, which gives the coating material certain characteristics that are objectionable. The use of pure recrystallized and deflocculated gypsum, free of aluminous gel, instead of satin white, gives a coating which, although acquiring a somewhat lower (less glossy) finish on calendering than satin white coatings, will show excellent levelness or smoothness, which is necessary to permit high grade printing. The coating which can be produced from our special form of gypsum also takes ink exceptionally well and in addition has other important advantages. A coating comprising the improved deflocculated gypsum base shows less tendency to darken when heavily calendered than does a coating material with a satin white base. The deflocculated gypsum requires less casein to secure a given adhesion of the coating to the body of the paper than that required when satin white is used as a base pigment. The deflocculated gypsum coating material can be dried, disintegrated, and then readily mixed again with water to form a smooth slurry, which is not true with satin white finishes, which are not readily re-dispersed properly after drying, owing to the presence of partially dehydrated aluminum oxide which is not reversible to gel form.

In hydrating plaster of Paris to form deflocculated hydrated gypsum, it has heretofore been thought necessary to use a relatively large amount of water (from 4 to 8 parts water per part plaster by weight) to prevent the slurry from setting during the agitation when a paddle agitator is used. The use of this large amount of water at a paper coating mill would be a considerable inconvenience, as it necessitates a partial dewatering of the prepared recrystallized gypsum slurry before it can be mixed with casein glue to form a "color" of consistency suitable for coating paper. This point is of particular importance as many coating mills do not have dewatering equipment such as filter presses and centrifuges which would be necessary to remove the excess water. However, while we have found it advantageous to prepare the paper coating with a much smaller amount of water than above indicated, yet, if desired, the deflocculated gypsum may be prepared by the use of a large amount of water to produce substantially the same end product; for we believe the use of recrystallized and/or deflocculated gypsum as a paper coating material to be new regardless of its method of manufacture.

We have found that by adding certain electrolytes in small amounts to the water in which the plaster is hydrated to form deflocculated gypsum, the tendency for the slurry to stiffen excessively or set during the hydration while being stirred in any suitable agitator, is considerably reduced, thus permitting the manufacture of deflocculated gypsum from a mixture of 1½ to 2 parts water per part of plaster by weight. A deflocculated gypsum so formed can be compounded to a satisfactory coating color by merely adding the requisite quantity of casein glue. We have found that from 1½ to 2 parts by weight of sodium carbonate per 100 parts of calcined gypsum plaster, or an equivalent amount of sodium sulphate, are effective in reducing the setting tendency of the plaster, although these limits can be widened considerably without essentially changing the characteristics desired in the process. A still more effective electrolyte is sodium phthalate, especially when made alkaline with a slight excess of caustic soda. The potassium salts of the above named electrolytes may also be used, if desired. Certain features of the herein described process of hydrating calcined gypsum are disclosed and claimed in co-pending Joseph W. Gill application Serial No. 107,371 filed October 24, 1936, which is a division of Offutt and Gill application Serial No. 666,352 filed April 15, 1933.

The exact reason for this action of these electrolytes is not completely known. Their effect on the size and shape of the gypsum crystals obtained on hydrating the calcined gypsum plaster will, undoubtedly, afford a partial explanation of the action. The crystals of hydrated gypsum, particularly when the alkaline phthalate is used, have a smaller length to breadth ratio than when ordinary plaster-water mix or plaster water mix containing small amounts of other salts are used. In general, as the particle size decreases, the consistency, the casein required for coating material, the opacity or hiding power, and hence, the whiteness of the applied coating, and the levelness or printing smoothness of the coating, increase. The glare obtainable seems to vary but little with change in particle size, but can be varied considerably by varying the calendering process. An additional advantage of the controlled shape and size obtainable with our improved gypsum pigment lies in the improved spreading qualities obtainable, for the spreading characteristics of precipitated gypsum "color" depends somewhat on the ratio of crystal length to thickness, an excessive length generally causing poorer spreading characteristics.

The product resulting when the calcined gypsum is agitated with the above amount of water, containing the electrolyte, consists of a slurry having about the consistency of stiff cream. This fluid slurry, after about one hour of agitation, contains deflocculated, completely hydrated gypsum in recrystallized form, the crystals averaging 4 times as long as broad with an average crystal length of 5.4 microns, while gypsum similarly hydrated but in the presence of water alone has crystals measuring about 10 times as long as broad and an average crystal length of 14 microns. A coating composition suitable for many purposes can be prepared by simply adding the proper amount of adhesive, such as casein glue, to the slurry. However, in many other cases it will be found desirable to incorporate other materials well known to the art, along with the adhesive and our improved gypsum pigment, to secure a coating composition having the properties desired.

This new gypsum product having the unique properties above described, will be termed "gamma gypsum" in the claims in order to differentiate from the gypsum products known to the prior art.

As a specific illustration of the application of this invention in the preparation of a casein-containing coating color, the following formula has been used with satisfaction: 8.5 parts by weight phthalic acid, and 5.5 parts of sodium hydroxide were dissolved in 1300 parts of water at room temperature. 850 parts of white molding plaster or calcined gypsum were added to this solution and the mix was stirred for one hour in a standard mechanical mixer. The slurry produced was now a viscous fluid. To this slurry were added 1100 parts of casein glue containing 170 parts of dry casein. It is immaterial whether the sodium phthalate is added as such, or whether it is formed in the solution by the use of phthalic acid or anhydride, together with the equivalent amount of sodium hydroxide, a slight excess of the latter being desirable. The resulting mixture after straining represents the coating color which is used directly on the paper coating machine.

It is sometimes desirable to utilize a mixture of the deflocculated gypsum and coating clay. In making up such a coating color, utilizing sodium carbonate as the electrolyte, the following procedure is followed:

To the agitator, 130 lbs. (15¾ gallons) of water at a temperature of 55° to 65° F. are added. One pound of soda ash is dissolved in this water, about 68 pounds of the calcined gypsum molding plaster are added to the solution and violent agitation started and continued for about 20 minutes, until the plaster slurry has stiffened, and the agitation is continued for 8 to 10 minutes thereafter. During the stiffening, the agitator should be operated as vigorously as the equipment will permit. The total time of agitation required will vary from 30 to 60 minutes, depending on slight variations in temperature, character of water used, and the nature of the agitator. During this agitation, the plaster will hydrate, taking up 12 pounds of water to form 80 pounds of finely crystalline, deflocculated, hydrated gypsum. Twenty pounds of coating clay (preferably powdered) are now added and mixed until a smooth paste results. If the paste has to stand some time before use, the addition of a little caustic soda, ammonia, or even lime, so as to impart a slight alkalinity to the slurry (litmus paper test), will inhibit any tendencies which the mixture may exhibit toward corrosion of iron utensils.

Immediately before adding the casein glue, dissolve 2½ pounds of soda ash in 12 pounds of water (heating gently if necessary to effect solution) and stir this into the hydrated gypsum-clay slurry. Then add the requisite amount of cool (not over 110° F.) casein glue. One hundred and eight pounds of casein glue of the formula given below contain about 17 pounds of dry casein, which is the average requirement for the batch of coating color described. After straining the color through a power strainer, a pint of Turkey red oil is added. The coating color is then ready for use, but may be thinned with water if desired. Although the adherence between the paper coating and the paper varies somewhat with the method used in preparing the casein glue, any of the ordinary casein solvents may be used without trouble. The following formula for the casein glue and the process of cutting has given good results:

| | Pounds |
|---|---|
| Water | 250 |
| Casein | 50 |
| Soda Ash | 10 |
| Borax | 2 |

The casein is soaked with about ¾ of the water for 30 minutes, stirring occasionally. The solvents are dissolved in the balance of the water and mixed with the casein after the soaking. The glue is then heated in a steam or hot water jacketed kettle to about 160° F. for 10 minutes, taking care not to overheat the glue above 185° F. Before mixing with the precipitated gypsum slurry, the glue should be cooled below 110° F. or curdling of the casein is apt to follow.

If desired, wax or stearic acid emulsions may be added to the coating material. Their use tends to inhibit any scuffing tendency which the paper may show, and to increase its glare somewhat. They are best mixed in the precipitated gypsum-clay paste before adding the casein glue. The mixing of the emulsion should be thorough to secure a uniform dispersion. A stearic acid emulsion may be prepared as follows:

| | Pounds |
|---|---|
| Stearic acid | 30 |
| Water | 150 |
| Borax | 1½ |

The above mixture should be heated to complete solution and 150 pounds more of hot water then added, stirring until a smooth, creamy emulsion is obtained. When a waterproof coating is desired, a dilute solution of formaldehyde containing 0.5 to 2.0% formaldehyde based on the casein, should be added to the slurry along with the casein glue. Animal glue, starch or dextrinized starch may be used as the adhesive with the improved gypsum pigment instead of casein, if desired.

The equipment required for making the deflocculated gypsum, is an agitator of sufficient strength that a positive agitation or kneading will be given to the whole plaster-water mix, together with such accessories as storage tanks, piping, weighing and measuring devices, etc. Since plaster, mixed at the consistency required in this process when soda ash is used as the set inhibitor does show a distinct, though reduced, tendency to set during hydration, the agitator must be sufficiently powerful to keep the slurry in fluid motion at all times. The maximum speed that can be used without throwing the material out of the agitator gives the best results. A power driven bakery mixer gives good results.

The deflocculated gypsum coating colors are handled on the coating machine in the usual manner. It may be found advisable to run the machine at a somewhat higher speed than usual, or else use a somewhat harder sized raw stock, as the paper stock seems to draw the water from the deflocculated gypsum coating faster during the setting stage of the operation than it does from a clay coating. The deflocculated gypsum coatings are relatively more satisfactory in medium and heavy coatings than in light (below 10 pounds) coatings. The essential point in finishing deflocculated gypsum coatings is to calender the paper with decidedly more pressure than is usually used, particularly, more than is used on satin white coatings. This can be safely done, as the deflocculated gypsum coating is substantially free from any tendency to blacken under pressure up to the limit the fiber will stand without crushing. The heavy calendering aids in bringing out the levelness characteristic of deflocculated gypsum coatings and in increasing the glare, and thus improves the printing qualities of the stock.

The main advantages of our improved deflocculated gypsum coating are:

Compared to clay coatings:
1. Smoother surface for printing.
2. Somewhat higher glare.
3. Whiter color.

Compared to satin white-clay coating:
1. Equal or better printing smoothness.
2. A more flexible sheet, permitting heavier coating without danger of cracking on folding.
3. Freedom from tendency to blacken on calendering.
4. Lower cost.

When a recrystallized gypsum paper coating pigment is to be prepared using a larger amount of water than that described in the examples above, the use of an electrolyte, such as sodium phthalate, is unnecessary since the mix is too thin to stiffen greatly during the hydration.

In this modified form of process, about 85 lbs. of calcined gypsum may be mixed with about 100 gallons of water in a ball mill for a period of about 25 to 30 minutes which is about 8 to 10 minutes after the calcined gypsum ordinarily stiffens due to hydration. The resulting recrystallized gypsum has an exceptionally fine crystal structure, and is therefore of especial smoothness in paper coating. After mixing, the slurry is passed through a centrifuge or filter press to remove most of the water. The moisture content of the thickened pulp is then determined, and the requisite quantity of clay, water, soda ash and casein glue are added as in the preceding process. If an ordinary mechanical mixer is used instead of a ball mill, about 80 gallons of water are used with 85 lbs. of calcined gypsum, and the mixing is carried out for about 40 minutes.

We would state in conclusion that while the examples described constitute practical embodiments of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:

1. A paper coating mixture comprising casein, a casein solvent, "gamma gypsum," alkali metal phthalate, clay, formaldehyde, and 1½ to 2 parts by weight of water based upon the "gamma gypsum."

2. A paper coating mixture, comprising casein, a casein solvent, "gamma gypsum," alkali metal phthalate, and 1½ to 2 parts by weight of water based upon the "gamma gypsum."

3. A paper coating mixture, comprising casein, a casein solvent, "gamma gypsum," alkali metal phthalate, formaldehyde, and 1½ to 2 parts by weight of water based upon the "gamma gypsum."

4. A paper coating mixture comprising casein, a casein solvent, "gamma gypsum," and water.

5. A paper coating mixture comprising casein, a casein solvent, formaldehyde, clay, "gamma gypsum," and water.

6. A paper coating mixture comprising a slurry of gypsum crystals suspended in an aqueous casein solution, said gypsum crystals having a special form characterized by being about four times as long as their transverse diameter and having an average length along the major axis of about 5.4 microns.

7. As an article of manufacture, paper having a surface coated with crystals of "gamma gypsum" and an adhesive.

8. As an article of manufacture, paper having a surface coated with gypsum crystals and a casein adhesive, said crystals having a special form characterized by being about four times as long as their transverse diameter and having an average length along the major axis of about 5.4 microns.

9. As an article of manufacture, paper having a surface coated with crystals of "gamma gypsum" embedded in a formaldehyde-hardened casein film.

10. As an article of manufacture, paper having a surface coated with clay and crystals of "gamma gypsum" embedded in a formaldehyde-hardened casein adhesive film.

JAMES S. OFFUTT.
JOSEPH W. GILL.